United States Patent [19]
Salisbury

[11] 4,318,449
[45] Mar. 9, 1982

[54] ELECTRIC DRIVE PROPULSION SYSTEM FOR VEHICLES

[76] Inventor: Winfield W. Salisbury, 5715 E. Cambridge, Scottsdale, Ariz. 85257

[21] Appl. No.: 959,330

[22] Filed: Nov. 9, 1978

Related U.S. Application Data

[63] Continuation of Ser. No. 846,929, Dec. 12, 1977, abandoned.

[51] Int. Cl.³ .............................................. B60K 1/00
[52] U.S. Cl. ................................................. 180/65 R
[58] Field of Search ............... 180/65 R, 65 A, 65 C, 180/65 D, 65 E; 318/140, 149, 139; 320/2, 5, 60, 61

[56] References Cited

U.S. PATENT DOCUMENTS

| 3,367,438 | 2/1968 | Moore | 180/65 A |
| 3,514,681 | 5/1970 | Dorn et al. | 180/65 R X |
| 3,792,327 | 2/1974 | Waldorf | 318/139 |
| 3,866,703 | 2/1975 | Eastham | 180/65 R |
| 3,904,947 | 9/1975 | Crews | 180/65 R |
| 4,095,664 | 6/1978 | Bray | 180/65 R |

Primary Examiner—Joseph E. Valenza
Assistant Examiner—Gene A. Church
Attorney, Agent, or Firm—Richards, Harris & Medlock

[57] ABSTRACT

A combination of a combustion engine connected to operate intermittently at its point of peak efficiency for effecting recharge of an electric power drive system provides a vehicle drive system capable of 100 miles per gallon.

11 Claims, 3 Drawing Figures ered and inefficient operating conditions. Also, the invention utilizes an electrical motor that will operate at high efficiency.
ELECTRIC DRIVE PROPULSION SYSTEM FOR VEHICLES This is a continuation of application Ser. No. 846,929, filed Dec. 12, 1977 now abandoned.

BACKGROUND OF THE INVENTION

This invention related to an electric drive system suitable for supplying power to the propulsion of vehicles such as automobiles, trucks, boats, etc. Since in the present state of the battery art no practical battery can supply sufficient power on one charge for an adequate travel range for the types of vehicles named, it is necessary to incorporate a charging system primarily dependent upon a combustion engine. Such systems as a whole are not new but they have had extremely limited applicability for various reasons including costs, electrical control problems and the like.

There are numerous reasons in today's world where energy shortage and energy cost have become so significant to reevaluate the combination combustion engine-battery type propulsion system as certain combinations of these elements enable a system to offer unique advantages clearly superior to existing combustion engines or to existing battery powered systems or combinations thereof.

By way of example, an automobile engine of current design, operated at its most efficient speed, is expected to have an efficiency of 20 to 25 percent. Nevertheless, the average efficiency of the ordinary motor car is much less, being only on the order 2–5 percent, primarily because of poor compression ratios at low speed operation. The problem is how to avoid inefficiencies which are incident to the operating cycle rather than to the basic engine construction.

SUMMARY OF THE INVENTION

The present invention seeks to provide a combination combustion engine and an electric power drive system capable of providing a highly efficient use of primary combustion fuels such as gasoline, oil, alcohol, etc. Thus, for maximum efficiency, it is proposed that the combustion engine prime mover be controlled to be operated always at or near its maximum efficiency, typically 20 to 25 percent, so that an increase in available gasoline mileage from the combined system might be expected to offer performances as much 100 miles per gallon.

In addition, the invention contemplates the feature of using unique high frequency multi-phase induction motors and generators to eliminate high velocity sliding contacts and the invention contemplates a variable speed commutator system for powering the induction-type drive motor, the commutator being independently driven as a means of providing a system that is economical to manufacture while offering a unique means of speed and torque control.

More particularly, this invention is concerned with an electric drive propulsion system for vehicles in which the system includes a power reservoir battery to energize a drive motor for powering the vehicle and a battery charging system comprised of means including a charging engine operable at a speed independent of the drive motor for electrically charging the battery and control means responsive to the charge state of the battery to energize the charging engine intermittently for operation at substantially optimum efficiency conditions.

As a further feature the invention provides an electric drive propulsion system including a commutator energized by the battery and connected to rotate independently from the drive motor to convert D.C. to A.C. or drive pulses for the drive motor.

Another feature is that the drive motor is a multi-phase induction motor and the system includes a commutator energized by the battery and means for driving the commutator independently of the drive motor and at engine shaft speed without sliding contacts to produce variable frequency multi-phase currents to allow the induction type drive motor to operate at substantially constant slip through a wide range of rotational speed.

Additional features that characterize the preferred embodiment are that the commutator and brush system have surges at low starting frequencies, and the system includes a pedal controlled auxiliary motor of small power compared to the drive motor and the charging engine and means for effecting throttle control and frequency variation of the propulsion system by means of the auxiliary motor.

In accordance with one modification, the commutator includes many intermediate segments for converting D.C. power to A.C. power, and means for capacitively coupling the segments to limit commutator sparking by reducing current and voltage changes between adjacent segments.

Other features and advantages of the invention will be apparent from the following description and claims, and are illustrated in the accompanying drawings which show structure embodying preferred features of the present invention and the principles thereof, and what is now considered to be the best mode in which to apply these principles.

GENERAL DESCRIPTION OF PREFERRED EMBODIMENT

Figure 1:
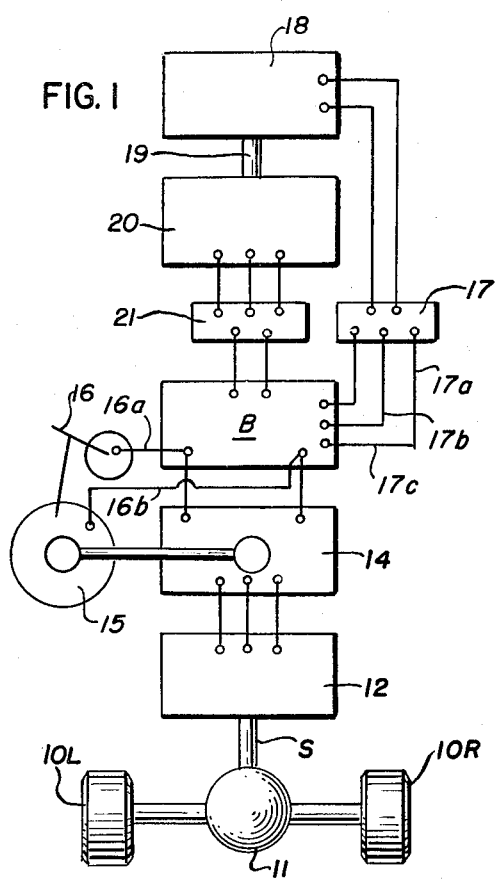
FIG. 1 is a schematic and diagrammatic representation of a two-wheel drive vehicle having an electric propulsion drive system in accordance with this invention.

Referring now to the drawings, and particularly to FIG. 1, relevant portions of a two-wheel drive automobile embodiment are illustrated powered by an electric drive propulsion system in accordance with this invention. Thus, the wheels 10L and 10R are shown connected to a differential gear 11 which is shown at the rear of the main drive shaft S of the vehicle.

An alternative automobile embodiment is to utilize 4 motors, one in each wheel, or 2 motors, one is each of the rear wheels or one in each of the front wheels. When a motor is applied directly to the wheel then it must operate at higher rotational speed than the wheel, thus requiring a speed reduction system. Such a system might possibly be a planetary gear built into each wheel with the motor, or with a motor attached to the automobile frame, a chain or belt drive to the wheel so that the wheel can be sprung independently of the motor weight. This can be done by having the motor shaft at the axis of the springing pivot for the wheels.

In the illustrated embodiment of the electric drive propulsion system of this invention, the system is shown as including a power reservoir battery B for energizing a drive motor 12 that powers the main drive shaft S in one-to-one relationship as shown here. As is explained in greater detail hereafter, a unique commutator system 14 is connected to be energized by the battery B and is connected to rotate independently from the main drive motor 12 to convert D.C. to A.C. or drive pulses for the main drive motor. The rotary drive for the commutator 14 is from an auxiliary drive motor 15 which is energized by the battery under the control of a foot pedal 16 for rotating the commutator 14 independently of the drive motor to produce variable frequency multi-phase currents and allow the induction-type drive motor 12 to operate at substantially constant slip through a wide range of rotational speed.

Since at the present stage of development, no batteries are available to drive an automobile a long distance from one charge, it is desirable to increase the range by providing an auxiliary battery charging system. For such a composite system, both lead and alkeline storage batteries are already available on the market because the auxiliary battery charging system reduces the performance characteristics of the battery, per se.

The battery charging system as shown in FIG. 1 includes a control computer 17 which is responsive to the state of charge of the battery B and is connected to control turn-on and turn-off of the combustion engine 18 which is shown connected through an output shaft 19 to drive the charging generator 20 for producing A.C. to be applied to a solid state rectifier 21 that is connected to supply its D.C. output to charge the battery B.

Thus in the illustrated embodiment, it may be noted that there is a first set of control lines 17A, 17B, 17C leading from the battery B to the computer 17 for controlling intermittent operation of the combustion engine 18 in accordance with the state of charge of the battery. Since its only function is to supply charging energy to the battery, the combustion engine is readily arranged to insure that the engine operates at substantially peak efficiency whenever it is in operation. Thus, the prime mover (the combustion engine) is effectually decoupled from fluctuations in the vehicle's power requirements.

The computer will continuously determine the charge state of the battery and bring on the charging prime mover whenever required. The computer will determine this by observing such variables as temperature, battery voltage, electrolyte acidity, or alkalinity, electrolyte density, and such other variables as are found to be practical indicators of the battery's charging requirement.

Another set of control lines 16A, 16B leads from the battery B to the mechanical pedal 16 to function as the power and velocity control for the vehicle and for powering the auxiliary motor 15 that connects directly to the commutator 14 for driving it at a speed independently of the speed of rotation of the main drive motor 12.

In general, the operation of the propulsion system is always provided by the output from the power reservoir battery B, which, is supplied as D.C. and is transformed by the variable speed commutator 14. The control pedal controls the speed of the auxiliary motor 15 and thereby controls the speed of the commutator (used here as an inverter) to vary the frequency of the inverted multi-phase A.C. that is applied to the main drive motor.

Battery Charging System

Since in the preferred practice of the invention the combustion engine 18 is to be of a small, high-speed type to operate at its maximum efficiency point, it is contemplated that the charging generator 20 which is powered by the combustion engine 18 be in the form of an induction motor having capacitance on the multiphased windings to produce the exciting current in the system. Such induction machines have the advantage of operating at relatively high frequency to permit the rotor of the charging generator to be arranged to operate at the shaft speed of the combustion engine. Such an arrangement facilitates a direct drive system free of any losses due to gear trains. Another advantage of the preferred arrangement is that no sliding contacts are required for the charging generator 20 so that its operation at high rotational speeds is substantially free of energy loss and wear. Suitable ball bearing designs offering long wear and capable of withstanding high rotational speeds are well-known.

Another advantage in construction of the charging generator 20 arises from the fact that the frequency of the rotor currents being not more than 10 percent of the frequency of the output stator current enables the laminations of the rotor to be much thicker than those of the stator and hence readily may be expected to be strong enough to withstand the expected centrifugal forces. The rotor windings themselves can be cast in.

The stator laminations must be thin to operate efficiently at the high frequencies resulting from the high rotational speeds of the combustion engine 18 and the corresponding resulting high frequency currents produced by the charging generator.

As indicated previously, the multi-phased output of the charging generator 20 is rectified by the solid state rectifier 21 to feed D.C. into the battery B with suitable voltage regulation so that the battery does not overcharge. The rectifier also includes facilities arranged to turn off and on as the battery becomes charged and discharged. This allows the system to always work at maximum efficiency from the standpoint of the combustion engine 18.

Electric Drive System

The electric drive system which is powered by the D.C. from the battery includes a multi-phase induction-type main drive motor 12 which requires no sliding contacts and is also characterized by a rotor of extremely simple construction. In the preferred practice of this invention multi-phase currents to drive such induction motors are produced from the D.C. battery by means of the commutator 14 which is driven by the small auxiliary motor 15 under the speed control of the foot pedal 16. The foot pedal controls the frequency to constitute the throttle and speed control for the vehicle and in an appropriately arranged embodiment, no gear shifting is necessary. In this connection, it should be noted that when the vehicle is in start mode, the frequency is low and the main drive motor 12 can give maximum torque at low speed and at suitable slip from the low frequency. To speed up the vehicle, the throttle foot pedal 16 is depressed to increase the frequency and the main drive motor 12 continues to produce increasing torque at increasing speed so that the horsepower available to power the main drive motor increases smoothly as needed by the increased vehicle speed.

Figure 2:
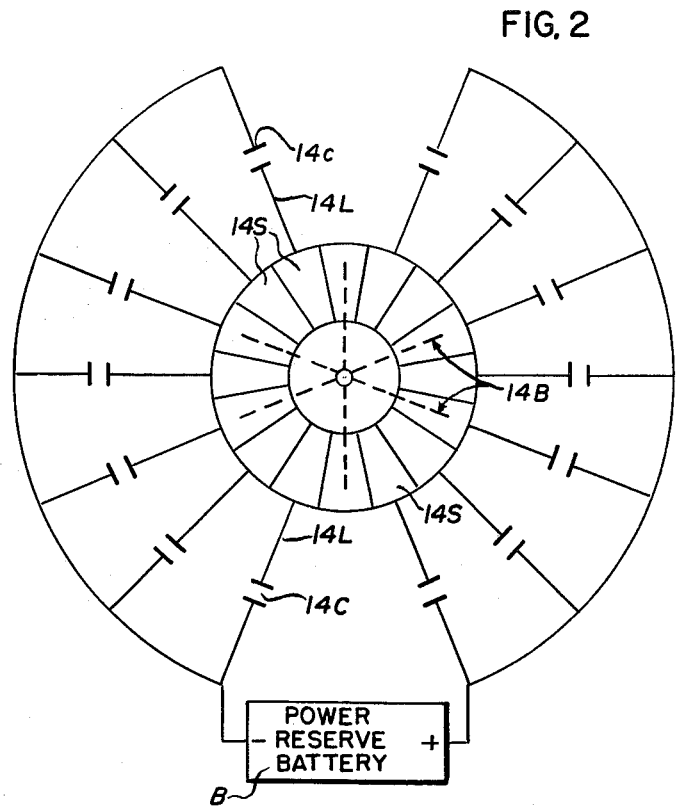
FIG. 2 is a electrical diagram representing a novel commutator system energized by a power reservoir battery, the commutator being represented for a three-phase A.C. output and having series capacitors of different sizes to control sparking.

To achieve the described starting and acceleration performance, the arrangement should be such that the commutator 14 is not subject to excessive sparking and such that the low inductance of the motors at low frequency does not draw excessive current from the battery and commutator system. Thus series electrical capacitors 14C are connected to the multi-phase leads 14L to the induction motor to prevent excessive current draw at the starting position. Such an arrangement is shown in FIG. 2 where different size capacitors 14C are represented connected to the different commutator segments, 14S. In FIG. 2, the commutator brush arms 14B for wiping contact with the segments 14S are diagrammatically represented by dashed lines.

Figure 3:
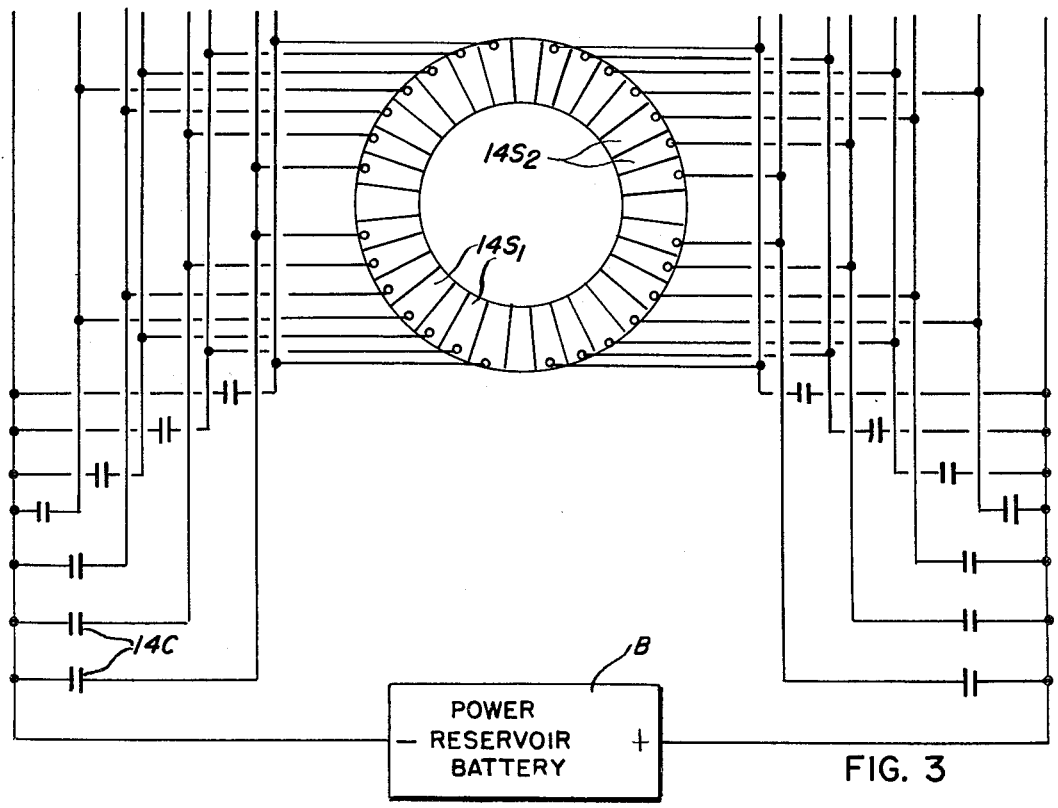
FIG. 3 is a electrical diagrammatic representation of another embodiment of commutator where two sets of segments are provided, each being provided with series capacitors of different values and the two sets of segments being shown connected to be energized from the power reservoir battery.

An even more advantageous system is to have a commutator as shown in FIG. 3 where many bars or segments 14S and 14S2 are arranged so that the values of the series capacitance 14C change as the commutator turns, thereby making the voltage between bars small and enabling an increase in the currents in a more gradual, regulated way tending to approximate a multiphased sine wave even though it is generated from the D.C. battery by the use of sliding contacts.

One of the features of the preferred embodiment is that the commutator 14 is driven independently with respect to the main drive motor 12 and also independently of the combustion engine. The commutator 14 operates on A.C. converted from D.C. under the control of the small auxiliary motor 15 which thereby controls the speed of the commutator. Thus the multi-phased A.C. supplied for operating the stator windings of the main drive motor 12 originates from the commutator independently of the speed of the main drive motor. It is the frequency of this A.C. that determines the speed of the main drive motor.

Main Drive Motor

As indicated previously for the induction motor design used as the basis of the charging generator, the induction motor for the main drive motor 12 will operate with rotor frequencies that are normally not more than 10 percent of the driving frequencies, this arrangement enabling thicker rotor laminations and simplifying rotor manufacture because the centrifugal forces are reasonable and the windings can be cast into the laminations.

It is important however for the contemplated automotive application that the induction motors run at much higher speed than the common 60 cycle variety of multi-phased induction motor in order to achieve the required horsepower within a small motor size. The induction motor size for a given horsepower is a function of the rotational speed and of the magnetic force which can be exerted on the rotor and which is limited by the saturation of the rotor iron. Therefore, the linear speed of the rotor is the most acceptable approach to increasing the horsepower for a given size and weight of motor.

In the automotive embodiment, the main drive motor 12 should have thin enough stator laminations to operate efficiently at a minimum of 600 cycles per second and the motor should have a top full horsepower rotational speed of approximately 30,000 revolutions per minute (500 revolutions per second).

In the presently preferred arrangement, the multiphased A.C. power for the main drive motor 12 is derived from the commutator 14 under the control of the foot pedal 16 which regulates the auxiliary motor 15 such that the electrical power source for the main drive motor is of variable frequency which is ideal since induction motors operate most efficiently and with maximum torque at a definite amount of slip from synchronous frequency. The ideal amount of slip is between 5 and 10 percent, with possibly 20 percent slip as a maximum. In the preferred arrangement, the main drive motor 12 is constructed to operate at 10 percent slip so that it increases torque up to 20 percent slip. Thus the motor operates in such a way that increased load on the wheels makes the motor draw more current and give more power, the preferred arrangement for driving an automobile.

For purposes of illustrative example, typical values for a main drive motor for an automobile are given here.

In order to illustrate the size and weight values for a multi-phase induction motor suitable to drive an automobile, assume:

| | |
|---|---|
| a wheel diameter | 29.0 inches |
| or circumference | 91.1 inches |
| with | 63,360 inches/mile |
| and find | 695.4 rev/mile |
| or | 811.4 R.P.M. for 70 mi/hr. |
| Assume a gear ratio | 3.5 |
| then the drive shaft has | 2840 R.P.M. |
| Assume 10% slip and a factor of 10 to get the commutator shaft speed, get | |
| commutator shaft speed for one set of segments | = 31240 R.P.M. |
| for 4 sets of segments | = 7810 R.P.M. |
| for 6 sets of segments | = 5207 R.P.M. |
| Further assume: the motor air gap will saturate with 14000 lines/cm², and that ⅔ of the gap area will be iron then | |
| the average gap flux | = 14000 × ⅔ lines/cm², |
| | = 9333. lines/cm² |

This gives available magnetic pressure, $P_B = B^2/8\pi$ dynes/cm², $= (9333.)^2/8\pi = 3.466 \times 10^6$ dynes/cm² (or 3.43 atmospheres) pressure. The force on the rotor of area A is $F = A \times P_B \times \frac{1}{2}$ dynes, where $\frac{1}{2} = <\sin^2\omega t>$.

The motor output in ergs/sec $= F \times R.P.S.$ Assume the motor output is 30 D.W. (approximately a 40 horsepower motor), further for 30,000 R.P.M. $= 500$ R.P.S., 30,000 joules/sec $= A \times P_B \times \frac{1}{2} \times 500) = 346.$ cm²

Assume a cylinder of length $= 10$ cm, then (since the area of the ends of the cylinder is not involved) $A = 2\pi r L$, and this gives $r = 346/20$ cm $= 5.5$ cm, or 11 cm. diameter, and the volume of the rotor is $V_r = 950$ cm³. Then reasonable dimensions for the multiphase induction motor give a volume $V_m$ for the motor of approximately three times the volume of the rotor, $V_m = 2850$ cm³, and, assuming (a high average of the iron, copper and air) a density p $= 8$, equivalent to that of iron the mass of the motor is $$M = p \times V_m = 8 \times 2850 = 22.8 \text{ kgm}$$
$$= 50 \text{ kbs.}$$

For half the speed this size would be increased by a factor of two to three, but since this is an outside figure with more detailed design it should be possible to attain a motor weight of one-half pound per horsepower.

Thus, while preferred contructional features of the invention are embodied in the structure illustrated herein, it is to be understood that changes and variations may be made by those skilled in the art without department from the spirit and scope of the appended claims.

What is claimed is:

1. In an electric drive propulsion system for vehicles, said system including:
    a variable speed main drive motor;
    a power reservoir battery to energize the drive motor for powering the vehicle;
    a battery charging system comprised of means including a charging engine operable independently of the drive motor for electrically charging the battery and control means responsive to the charge state of the battery to energize the charging engine intermittently for operation at substantially optimum efficiency conditions;
    a commutator connected between the battery and the drive motor for receiving electrical power from said battery and producing a variable frequency alternating current for powering said drive motor; and
    means independent of said drive motor for rotating said commutator, the rate of rotation of said commutator determining the frequency of said alternating current provided to said drive motor.

2. In an electric drive propulsion system as defined in claim 1 wherein the drive motor is a multiphase induction motor which operates at substantially constant slip through a wide range of rotational speed.

3. In an electric drive propulsion system as defined in claim 1 wherein the drive motor is a multiphase induction motor and said means for rotating comprises a high speed auxiliary drive motor energized by the battery.

4. In an electric drive propulsion system as defined in claim 1 said commutator including a brush system having series capacitors connected thereto to limit current surges at low starting frequencies.

5. In a system as defined in claim 1 wherein the commutator includes many intermediate segments for converting D.C. power to A.C. power, and means for capacitively coupling the segments to limit commutator sparking by reducing current and voltage changes between adjacent segments.

6. In an electric drive propulsion system as defined in claim 1 wherein said means for rotating comprises a pedal controlled auxiliary motor of small power compared to the drive motor and the charging engine and means for effecting throttle control and frequency variation of the propulsion system by means of the auxiliary motor.

7. An electric drive system for propelling a vehicle, which comprises:
    a battery;
    means for maintaining said battery in sufficiently charged condition;
    commutator means connected to said battery;
    multiphase, variable speed induction drive motor means coupled to said commutator;
    means for rotating said commutator means independently of said drive motor means; and
    means for selectively driving said commutator means independently of said drive motor means to apply variable frequency, multiphase current to said drive motor means thereby controlling the speed and torque output thereof.

8. The drive system of claim 7, wherein the means for maintaining said battery in charged condition comprises:
    a generator connected to said battery;
    drive means coupled to said generator; and
    means responsive to the charged condition of said battery for controlling said generator drive means.

9. The drive system of claim 7, wherein said commutator includes a plurality of segments for inverting current from said battery, and further comprising:
    a plurality of capacitors connected between the segments of said commutator and said battery to reduce sparking and current draw upon starting.

10. The drive system of claim 7, wherein the means for driving said commutator means comprises:
    an auxiliary motor drivingly connected to said commutator means; and
    means for selectively controlling the speed of said auxiliary motor.

11. In an electric vehicle drive system of the type including a battery, means for maintaining the battery in charged condition, and an electric drive motor connected to the battery for actuation thereby, the improvement which comprises:
    said drive motor being a multiphase variable speed motor;
    a commutator connected between said battery and drive motor;
    means for rotating said commutator independently of said drive motor; and
    means for selectively driving said commutator independently of said drive motor such that current from said battery is converted into variable frequency multiphase current and is applied to said drive motor whereby said drive motor operates at substantially constant slip at different speeds.

* * * * *